US011459067B2

(12) United States Patent
Duensing et al.

(10) Patent No.: US 11,459,067 B2
(45) Date of Patent: Oct. 4, 2022

(54) SYSTEMS AND PROCESSES FOR RECOVERING A CONDENSATE FROM A CONDUIT

(71) Applicant: SOFEC, INC., Houston, TX (US)

(72) Inventors: Martin Matthew Duensing, Cypress, TX (US); Samuel David Waronoff, Katy, TX (US); Asis Nandi, Houston, TX (US); Ramachandran Gopalakrishnan, Richmond, TX (US); Yuen How Leow, Singapore (SG)

(73) Assignee: SOFEC, INC., Houston, TX (US)

( * ) Notice: Subject to any disclaimer, the term of this patent is extended or adjusted under 35 U.S.C. 154(b) by 277 days.

(21) Appl. No.: 16/739,513

(22) Filed: Jan. 10, 2020

(65) Prior Publication Data

US 2021/0171159 A1    Jun. 10, 2021

Related U.S. Application Data

(60) Provisional application No. 62/944,247, filed on Dec. 5, 2019.

(51) Int. Cl.
*B63B 22/02* (2006.01)
*B63B 13/00* (2006.01)
*B63B 35/44* (2006.01)

(52) U.S. Cl.
CPC ............ *B63B 22/021* (2013.01); *B63B 13/00* (2013.01); *B63B 35/44* (2013.01); *B63B 2035/448* (2013.01)

(58) Field of Classification Search
CPC ....... B63B 35/44; B63B 13/00; B63B 22/021; B63B 2035/448
See application file for complete search history.

(56) References Cited

U.S. PATENT DOCUMENTS 3,118,155 A   1/1964   Siegel
3,236,267 A   2/1966   Bily
(Continued)

FOREIGN PATENT DOCUMENTS

EP   0796784 A1   9/1997
EP   1178922 B1   8/2004
(Continued)

OTHER PUBLICATIONS

International Search Report and Written Opinion for International Application No. PCT/US2020/063398 dated Apr. 9, 2021.
(Continued)

*Primary Examiner* — S. Joseph Morano
*Assistant Examiner* — Jovon E Hayes
(74) *Attorney, Agent, or Firm* — Edmonds & Cmaidalka, P.C.

(57) ABSTRACT

Systems and processes for recovering a condensate from a conduit. In one embodiment, the system can include a floating buoy that can include a fluid swivel assembly coupled thereto. The system can also include a floating conduit, a first gas transfer conduit, and a second gas transfer conduit that can be configured to transfer a gas discharged from a vessel storage tank to a pipeline end manifold located at a subsea location. The system can also include a first condensation conduit, a pump, and a second condensation conduit that can be configured to transfer at least a portion of any condensate that accumulates within an internal volume of the floating conduit at a low point between the vessel storage tank and the first gas transfer conduit into a flow path defined by a first swivel section of the fluid swivel assembly, a storage tank, or a combination thereof.

20 Claims, 9 Drawing Sheets

(56) References Cited

U.S. PATENT DOCUMENTS

| | | | |
|---|---|---|---|
| 3,602,174 | A | 8/1971 | Gorman |
| 3,641,602 | A | 2/1972 | Flory et al. |
| 3,677,310 | A | 7/1972 | Dobler et al. |
| 3,722,723 | A | 3/1973 | Gratz |
| 3,840,927 | A | 10/1974 | Reid, Jr. |
| 3,979,785 | A | 9/1976 | Flory |
| 4,042,990 | A * | 8/1977 | Donaldson, Jr. ...... B63B 22/021 441/5 |
| 4,065,822 | A | 1/1978 | Wilbourn |
| 4,173,804 | A | 11/1979 | Duc |
| 4,176,615 | A | 12/1979 | Reid et al. |
| 4,176,986 | A | 12/1979 | Taft et al. |
| 4,226,204 | A | 10/1980 | Tuson |
| 4,320,545 | A | 3/1982 | Pomonik |
| 4,321,720 | A | 3/1982 | Havre |
| 4,339,002 | A | 7/1982 | Gibbs |
| 4,490,121 | A | 12/1984 | Coppens et al. |
| 4,516,942 | A | 5/1985 | Pedersen |
| 4,530,302 | A | 7/1985 | Pedersen |
| 4,556,340 | A | 12/1985 | Morton |
| 4,568,295 | A | 2/1986 | Poldervaart |
| 4,637,335 | A | 1/1987 | Pollack |
| 4,648,848 | A | 3/1987 | Busch |
| 4,825,797 | A | 5/1989 | Poldervaart et al. |
| 4,836,813 | A | 6/1989 | Poldervaart |
| 4,891,495 | A | 1/1990 | Araki |
| 4,892,495 | A | 1/1990 | Svensen |
| 4,906,137 | A | 3/1990 | Maloberti et al. |
| 5,564,957 | A | 10/1996 | Breivik et al. |
| 5,927,224 | A | 7/1999 | Etheridge et al. |
| 6,021,848 | A | 2/2000 | Breivik et al. |
| 6,109,989 | A | 8/2000 | Kelm et al. |
| 6,227,135 | B1 | 5/2001 | Pedersen |
| 6,415,828 | B1 | 7/2002 | Duggal et al. |
| 6,439,147 | B2 | 8/2002 | Cottrell et al. |
| 6,558,215 | B1 | 5/2003 | Boatman |
| 6,688,930 | B2 | 2/2004 | Cottrell et al. |
| 6,932,015 | B2 | 8/2005 | Storvoll et al. |
| 7,416,025 | B2 | 8/2008 | Bhat et al. |
| 8,430,170 | B2 | 4/2013 | Pionetti et al. |
| 8,763,549 | B2 | 7/2014 | Liu et al. |
| 2001/0029879 | A1 | 10/2001 | Cottrell et al. |
| 2004/0094082 | A1 | 5/2004 | Boatman et al. |
| 2011/0120126 | A1 * | 5/2011 | Srinivasan ............... F03G 7/05 60/641.7 |
| 2013/0240085 | A1 | 9/2013 | Hallot et al. |
| 2021/0163278 | A1 * | 6/2021 | Huijsmans-Steenkamp ................ B63B 22/00 |
| 2021/0171159 | A1 * | 6/2021 | Duensing ............... B63B 13/00 |

FOREIGN PATENT DOCUMENTS

| | | | |
|---|---|---|---|
| EP | 1832798 | 9/2007 | |
| KR | 20120122502 | 11/2012 | |
| WO | 96/36529 | 11/1996 | |
| WO | 97/00806 | 1/1997 | |
| WO | 99/57413 | 11/1999 | |
| WO | WO-0147768 A1 * | 7/2001 | ............ B63B 13/02 |
| WO | WO-2007072136 A2 * | 6/2007 | ............... F17C 5/06 |

OTHER PUBLICATIONS

PCT Written Opinion and International Search Report of international application No. PCT/US2010/060104 dated Feb. 14, 2011.

* cited by examiner

SYSTEMS AND PROCESSES FOR RECOVERING A CONDENSATE FROM A CONDUIT

CROSS-REFERENCE TO RELATED APPLICATION

This application claims priority to U.S. Provisional Patent Application No. 62/944,247, filed on Dec. 5, 2019, which is incorporated by reference herein.

BACKGROUND

Field

Embodiments described generally relate to offshore single point mooring marine terminals. More particularly, such embodiments relate to offshore mooring buoys configured to transfer fluids to and from a vessel moored thereto and systems and processes for using same.

Description of the Related Art

In the drilling, production, and transportation of offshore liquid hydrocarbons, mooring buoys have been used to connect floating vessels to loading/unloading capabilities away from shore. A single point mooring(SPM) marine terminal includes a loading/unloading buoy anchored offshore that serves as a mooring link between geostatic subsea pipeline end manifold (PLEM) connections and the floating vessels. The buoy includes a material transfer system that transports liquid hydrocarbons between the pipeline end manifold and the vessel, for example from the pipeline end manifold into a vessel storage tank. The buoy connects to the pipeline end manifold using one or more submarine conduits, riser lines, or hoses. The pipeline end manifolds connect to pipelines that carry liquid hydrocarbons to and from near-shore or on-shore facilities or locations for distribution and/or processing.

During loading operations, a vessel is moored to a conventional single point mooring marine terminal. One or more floating transport lines or hoses are placed in fluid communication with the vessel storage tank and the single point mooring marine terminal. Liquid hydrocarbons are then conveyed from the pipeline, through the submarine lines, the buoy, the floating transport lines, and into the vessel storage tank(s). Conventional liquid hydrocarbon carrying vessel storage tanks are designed to safely operate within specified pressure ranges. As the liquid hydrocarbon is introduced into the vessel storage tank, gas within the tank is displaced such that a pressure within the vessel storage tank can be maintained within the specified ranges. Current processes for controlling the pressure within the tank include venting, displacing, or otherwise discharging the gas directly to the atmosphere.

There is a need, therefore, for improved systems and processes for capturing gas displaced from vessel storage tanks during loading operations that avoid or substantially reduce gases from being introduced into the atmosphere.

SUMMARY

Systems and processes for recovering a condensate from a conduit are provided. In one embodiment, the system can include a floating buoy. The floating buoy can include a fluid swivel assembly coupled thereto. The fluid swivel assembly can include a first swivel section rotatably coupled to a second swivel section. The system can also include a floating conduit, a first gas transfer conduit, and a second gas transfer conduit that can be configured to transfer a gas discharged from a vessel storage tank to a pipeline end manifold located at a subsea location. The floating conduit can include a low point between the vessel storage tank and the first gas transfer conduit. The system can also include a first condensation conduit, a pump, and a second condensation conduit that can be configured to transfer at least a portion of any condensate that accumulates within an internal volume of the floating conduit at the low point into a flow path that can include the first swivel section or a storage tank.

In one embodiment, the process for recovering a condensate from a floating conduit can include conveying a gas from a vessel through a floating conduit and into a gas transfer conduit. The process can also include conveying the gas through the gas transfer conduit and into a flow path that can include a fluid swivel assembly. A portion of the gas can condense within an internal volume of the floating conduit during transfer of the gas therethrough to produce a liquid condensate. The process can also include pumping, with a pump in fluid communication with the internal volume at a low point of the floating conduit, at least a portion of the liquid condensate from the internal volume into the gas transfer conduit such that the at least a portion of the liquid condensate flows into the flow path defined by the fluid swivel assembly or a storage tank.

In one embodiment, the system can include a floating buoy. The floating buoy can include a rotatable turntable. The rotatable turntable can include a fluid swivel assembly coupled thereto and the fluid swivel assembly can include a first swivel section rotatably coupled to a second swivel section. The system can further include a first gas transfer conduit in fluid communication with a first flow path defined by the first swivel section, a second gas transfer conduit in fluid communication with a first flow path defined by the second swivel section and a first pipeline end manifold located at a first subsea location. The system can further include a first floating conduit in fluid communication with the first gas transfer conduit, wherein the first floating conduit, the first gas transfer conduit, and the second gas transfer conduit can be configured to convey a gas discharged from a vessel storage tank, through the floating buoy, and into the first pipeline end manifold, and the first floating conduit can include a low point between the vessel storage tank and the first gas transfer conduit. A first condensation conduit can have a first end in fluid communication with an internal volume of the first floating conduit at the low point of the first floating conduit. A pump can be in fluid communication with a second end of the first condensation conduit. The pump can include an air driven positive displacement or diaphragm pump, an electric powered pump, a hydraulic driven pump, or a hydrocarbon powered pump. The system can further include a second condensation conduit where a first end of the second condensation conduit can be in fluid communication with the pump and a second end of the second condensation conduit can be in fluid communication with the flow path defined by the first swivel section, and the first condensation conduit, the pump, and the second condensation conduit can be configured to convey a liquid condensate from the internal volume of the first floating conduit into the flow path defined by the first swivel section. A first liquid transfer conduit can be in fluid communication with a second flow path defined by the first swivel section and a second liquid transfer conduit can be in fluid communication with a second flow path defined by the second swivel section and a second pipeline end manifold located at a second subsea location. The first swivel section and the second swivel section can be configured to maintain fluid communication between the first liquid transfer conduit and the second liquid transfer conduit. The first swivel section and the second swivel section can be configured to maintain fluid communication between the first gas transfer conduit and the second gas transfer conduit and the first liquid transfer conduit and the second liquid transfer conduit can be configured to transfer a liquid from a second subsea location, through the floating buoy, and into the vessel storage tank.

BRIEF DESCRIPTION OF THE DRAWINGS

The various aspects and advantages of the preferred embodiment of the present invention will become apparent to those skilled in the art upon an understanding of the following detailed description of the invention, read in light of the accompanying drawings which are made a part of this specification.

DETAILED DESCRIPTION

Figure 1:
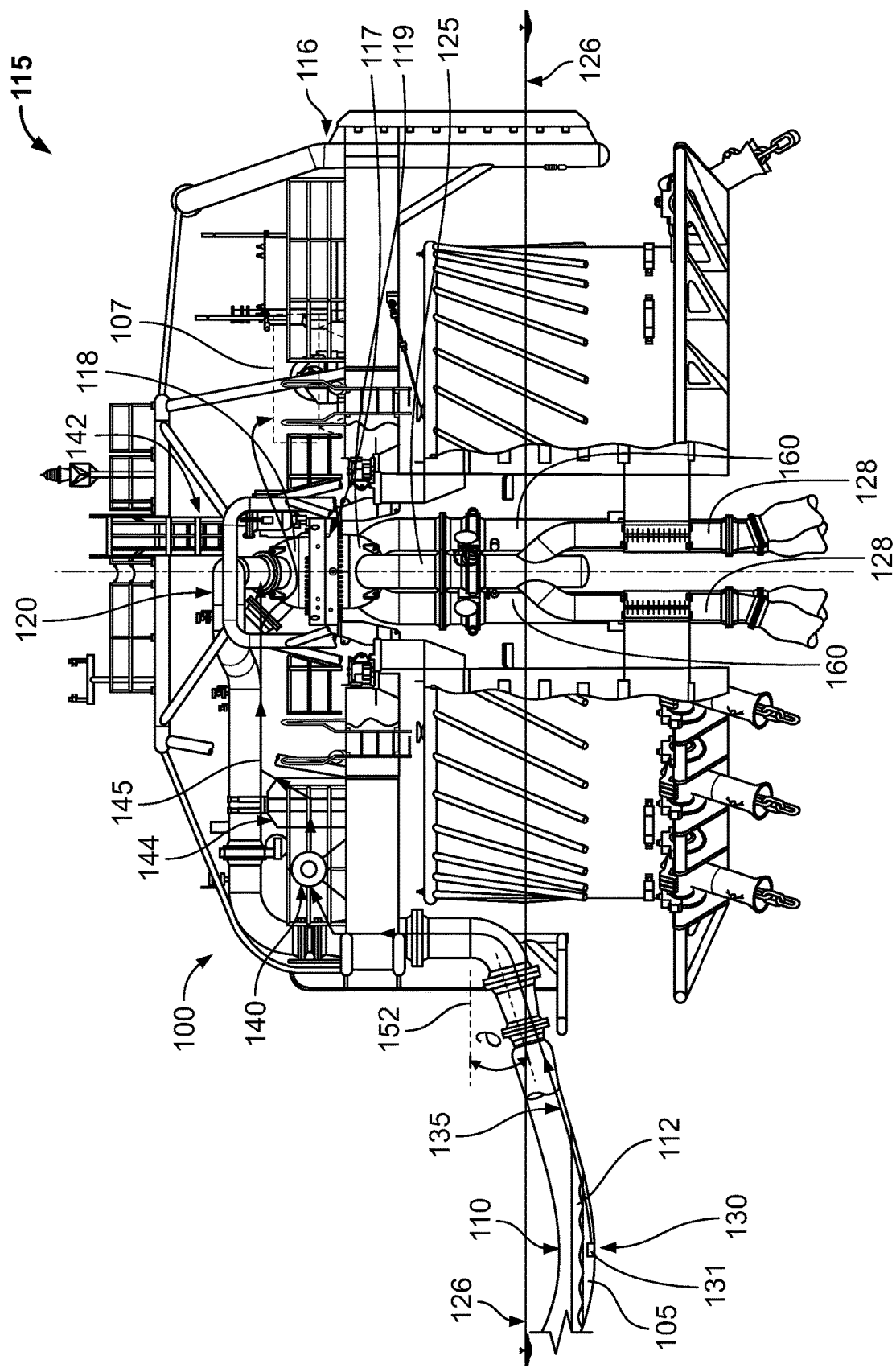
FIG. 1 depicts a schematic partial elevation view of an illustrative buoy having a condensation conveyance apparatus for recovering a condensate from a floating conduit coupled to the buoy, according to one or more embodiments.

A detailed description will now be provided. Each of the appended claims defines a separate invention, which for infringement purposes is recognized as including equivalents to the various elements or limitations specified in the claims. Depending on the context, all references to the "invention", in some cases, refer to certain specific or preferred embodiments only. In other cases, references to the "invention" refer to subject matter recited in one or more, but not necessarily all, of the claims. It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the Figures. Moreover, the formation of a first feature over or on a second feature in the description that follows includes embodiments in which the first and second features are formed in direct contact and also includes embodiments in which additional features are formed interposing the first and second features, such that the first and second features are not in direct contact. The exemplary embodiments presented below may be combined in any combination of ways, i.e., any element from one exemplary embodiment may be used in any other exemplary embodiment, without departing from the scope of the disclosure. The figures are not necessarily drawn to scale and certain features and certain views of the figures can be shown exaggerated in scale or in schematic for clarity and/or conciseness.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Also, the naming convention used herein is not intended to distinguish between components that differ in name but not function. Furthermore, in the following discussion and in the claims, the terms "including" and "comprising" are used in an open-ended fashion, and thus should be interpreted to mean "including, but not limited to."

All numerical values in this disclosure are exact or approximate values ("about") unless otherwise specifically stated. Accordingly, various embodiments of the disclosure may deviate from the numbers, values, and ranges disclosed herein without departing from the intended scope.

Further, the term "or" is intended to encompass both exclusive and inclusive cases, i.e., "A or B" is intended to be synonymous with "at least one of A and B," unless otherwise expressly specified herein. The indefinite articles "a" and "an" refer to both singular forms (i.e., "one") and plural referents (i.e., one or more) unless the context clearly dictates otherwise. The terms "up" and "down"; "upward" and "downward"; "upper" and "lower"; "upwardly" and "downwardly"; "above" and "below"; and other like terms used herein refer to relative positions to one another and are not intended to denote a particular spatial orientation since the apparatus and methods of using the same may be equally effective at various angles or orientations.

Figure 2:
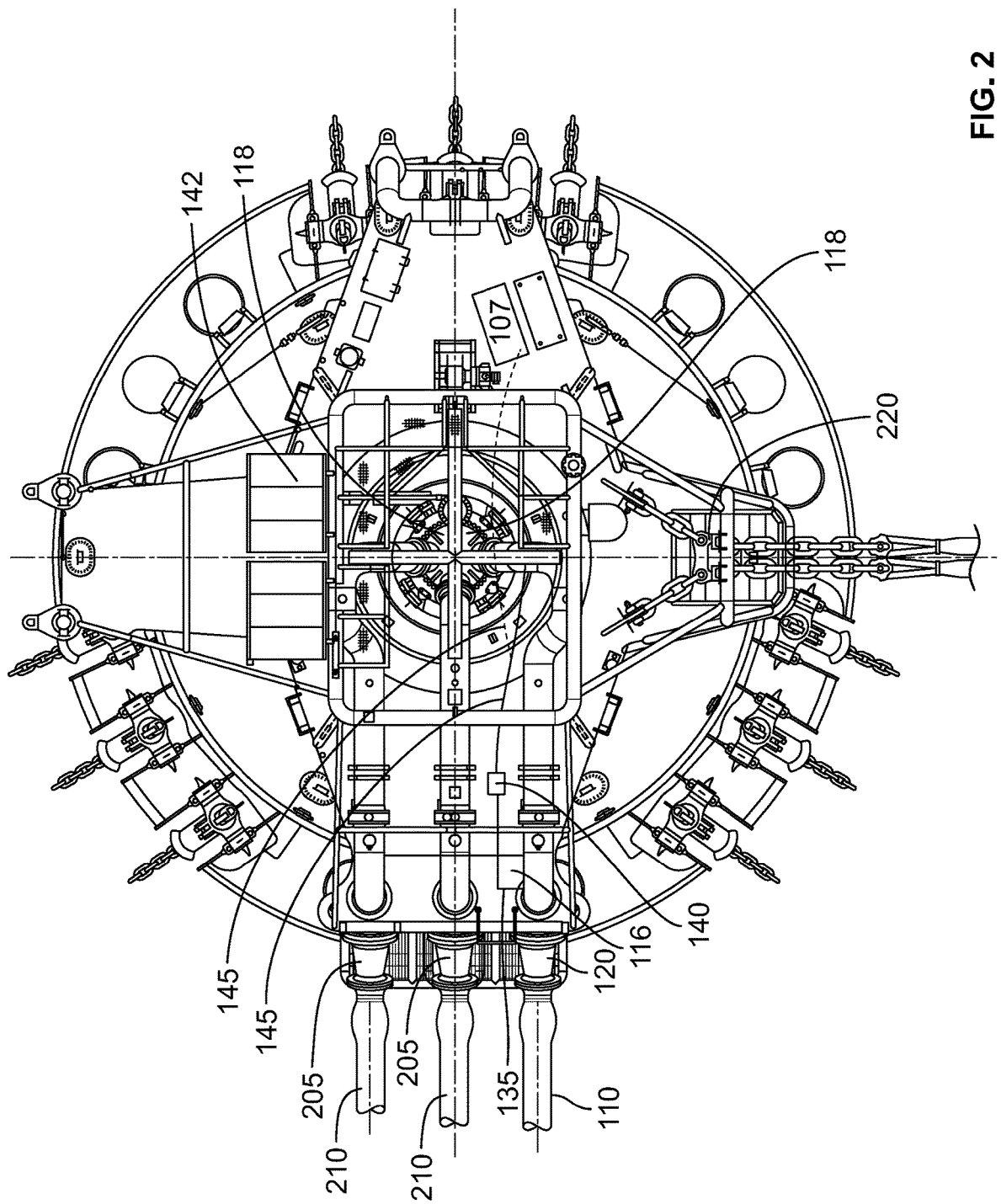
FIG. 2 depicts a schematic plan view of the buoy and the condensation conveyance apparatus shown in FIG. 1.

FIG. 1 depicts a schematic partial elevation view of an illustrative buoy 115 having a condensation conveyance apparatus 100 for recovering a condensate 105 from a first floating conduit 110 coupled to the buoy 115, according to one or more embodiments. FIG. 2 depicts a schematic plan view of the buoy 115 and the condensation conveyance apparatus 100 shown in FIG. 1. The first floating conduit 110 can be adapted or configured to convey a gas. In some examples, the gas can be or can include an exhaust gas, air, an inert gas such as nitrogen or carbon dioxide, a hydrocarbon gas, or any mixture thereof. In some examples, the gas can include water vapor and when the gas is conveyed through the first floating conduit 110, at least a portion of the water vapor can condense and pool or otherwise collect within a low point 130 of the first floating conduit 110 as the condensate 105. In other examples, the gas can include water vapor and/or other vaporized compound(s), e.g., a vaporized hydrocarbon, solvent, or other gaseous compounds, and when the gas is conveyed through the first floating conduit 110, at least a portion of the water vapor and/or other vaporized compound(s) can condense and pool or otherwise collect within a low point 130 of the first floating conduit 110 as the condensate 105.

The condensation conveyance apparatus 100 can include a first condensation conduit 135, a pump 140, and a second condensation conduit 145. The first condensation conduit 135, the pump 140, and the second condensation conduit 145 can be adapted or configured to convey at least a portion of the condensate 105 from within the floating conduit 110 to another location. For example, the condensate 105 can be conveyed from the floating conduit 110 into a flow path including a fluid swivel assembly 117 coupled to the buoy 115, into an optional condensate storage tank 107, and/or transferred to a service vessel.

A first end of the first condensation conduit 135 can be in fluid communication with an internal volume 112 of the first floating conduit 110 such as at the low point 130. In some examples, at least a portion of the first condensation conduit 135 can be disposed within the first floating conduit 110. In some examples, a weight of the first end of the first condensation conduit 135 can be sufficient to urge the first end of the first condensation conduit 135 toward the low point 130 of the first floating conduit 110. In other examples, the first end of the first condensation conduit 135 can be coupled directly to an inner wall of the first floating conduit 110 in fluid communication with the internal volume 112, for example via one or more mechanical fasteners. In some examples, a filter 131 can be coupled to the first end of the first condensation conduit 135 such that a filter inlet can be in fluid communication with the internal volume 112 and a filter outlet can be in fluid communication with the first end of the first condensation conduit 135. The filter 131 can be adapted or configured such that the filter inlet can convey condensate 105 from the low point 130, for example by adapting or configuring the filter 131 with sufficient weight to cause the inlet of the filter 131 to face the low point 130.

In other examples, the first end of the first condensation conduit 135 can be in fluid communication with the internal volume 112 of the first floating conduit 110 at the low point 130 via an aperture disposed through a wall of the first floating conduit 110. In this example, the first end of the first condensation conduit 135 can be maintained in fluid communication with the low point 130 of the first floating conduit 110 by being coupled directly to the wall of the first floating conduit 110. In other examples, an aperture disposed through the wall of the first floating conduit 110 can permit at least a portion of the condensate 105 to drain or otherwise flow, for example by using the pump 140 or a secondary pump, into an external sump volume and the first end of the first condensation conduit 135 can be in fluid communication with the external sump volume.

The pump 140 can be in fluid communication with a second end of the first condensation conduit 135. The second condensation conduit 145 can have a first end in fluid communication with the pump 140 and a second end in fluid communication with the storage tank 107 and/or the flow path including the fluid swivel assembly 117.

The pump 140 can be adapted or configured to convey the condensate 105 from the internal volume 112 of the first floating conduit 110 to the storage tank 107 and/or the flow path including the fluid swivel assembly 117. The pump 140 can be a positive displacement pump, a centrifugal pump, or any type of pump. In some examples, the pump 140 can be or can include an air driven positive displacement or diaphragm pump, an electric powered pump, a hydraulic driven pump, a hydrocarbon powered pump, and/or any other power source capable of driving the pump. In some examples, when the pump is an air driven pump, compressed air to drive the air driven pump can be stored in an air tank 144 disposed on the buoy 115. The air tank 144 can be an accumulator tank and can collect a volume of air at pressures of between about 50 pounds per square inch gauge (psig) to about 100 psig or from about 75 psig to about 150 psig, or greater, for driving the air driven pump. In some examples, the air tank 144 can be adapted or configured to contain a volume of compressed air sufficient to operate the air driven pump as needed between maintenance activities on the buoy 115. In other examples, an air compressor can be in fluid communication with the air tank 144 and can be adapted or configured to introduce compressed air into the tank 144 when the pressure falls below a pre-determined pressure. In some embodiments, electric power to run safety lights, an electrical driven pump, if present, the air compressor, and/or other equipment can be produced by a solar panel and power storage assembly 142 disposed on the buoy 115, for example on an upper surface of a turntable 116. In other embodiments, the electric power can be provided via a power cable from an alternate location, for example, on-shore or a near-by platform. A hydraulic delivery system can be disposed on the buoy 115 to run a hydraulic driven pump. Natural gas, propane, gasoline, diesel fuel, and/or other hydrocarbons, along with the necessary equipment to provide power to a hydrocarbon driven pump, the air compressor, or any other equipment on the buoy 115, can be stored on the buoy 115 to run the hydrocarbon driven pump.

The first condensation conduit 135 and the second condensation conduit 145 can each be or can include one or more conduit segments coupled together. The first condensation conduit 135 and the second condensation conduit 145 can convey liquids such as the condensate 105. The first condensation conduit 135 and the second condensation conduit 145 can be made from any suitable material. For example, the condensation conduits can be made from a synthetic fiber such as polyester or nylon filament, rubber, synthetic rubbers, metal alloys, or other suitable materials.

When a sufficient amount of condensate 105 collects within the first floating conduit 110 at the low point 130, the pump 140 can be operated to cause a suction within the first condensation conduit 135. The suction can convey at least a portion of the condensate 105 from the internal volume 112 to the inlet of the pump 140. The pump 140 can expel the condensate 105 from the outlet and into the second condensation conduit 145 and convey the condensate 105 to the optional storage tank 107, the flow path including the fluid swivel assembly 117, or a combination thereof. It should be understood that in some examples, the second condensation conduit 145 can be the outlet of the pump 140. For example, the outlet of the pump 140 can be coupled directly to and in fluid communication with the storage tank 107 and/or the flow path including the fluid swivel assembly 117.

Figure 3:
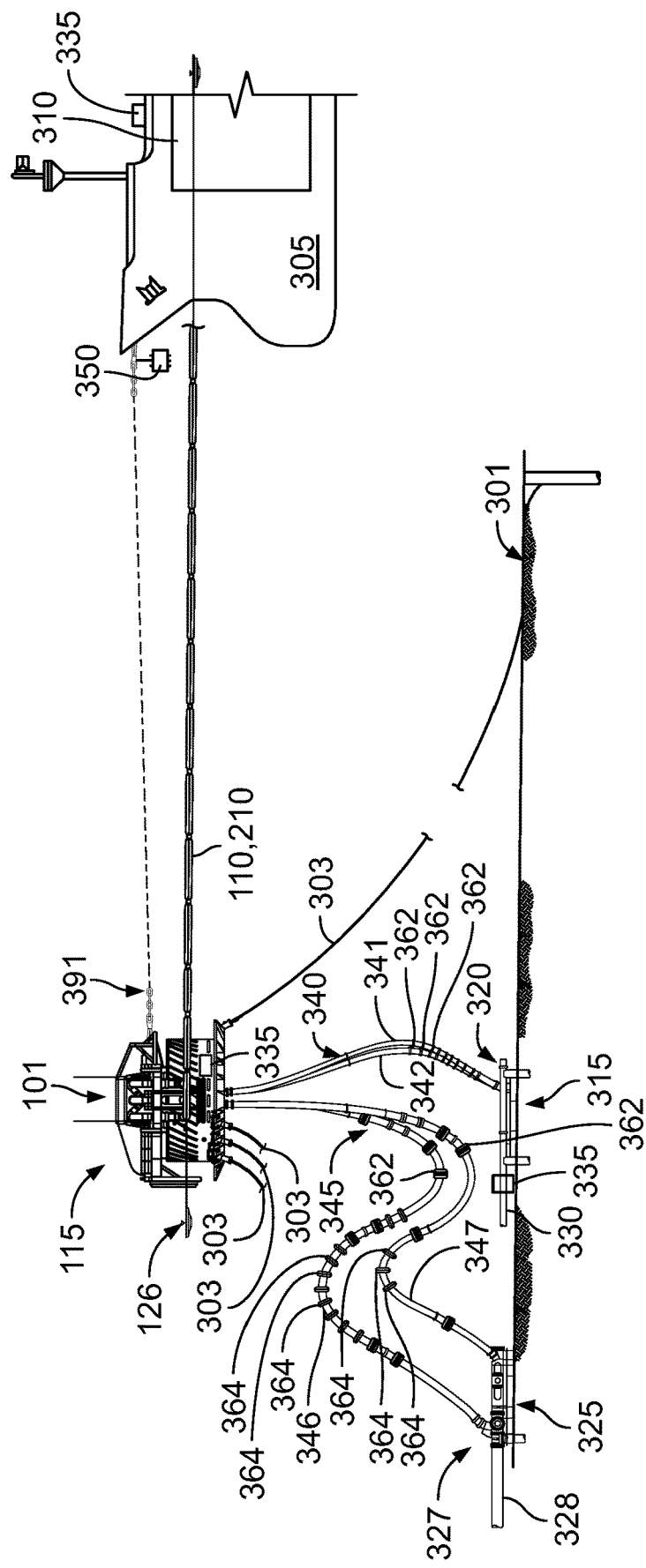
FIG. 3 depicts a schematic elevation view of an illustrative single point mooring marine terminal having a floating vessel moored thereto, according to one or more embodiments.
Figure 4:
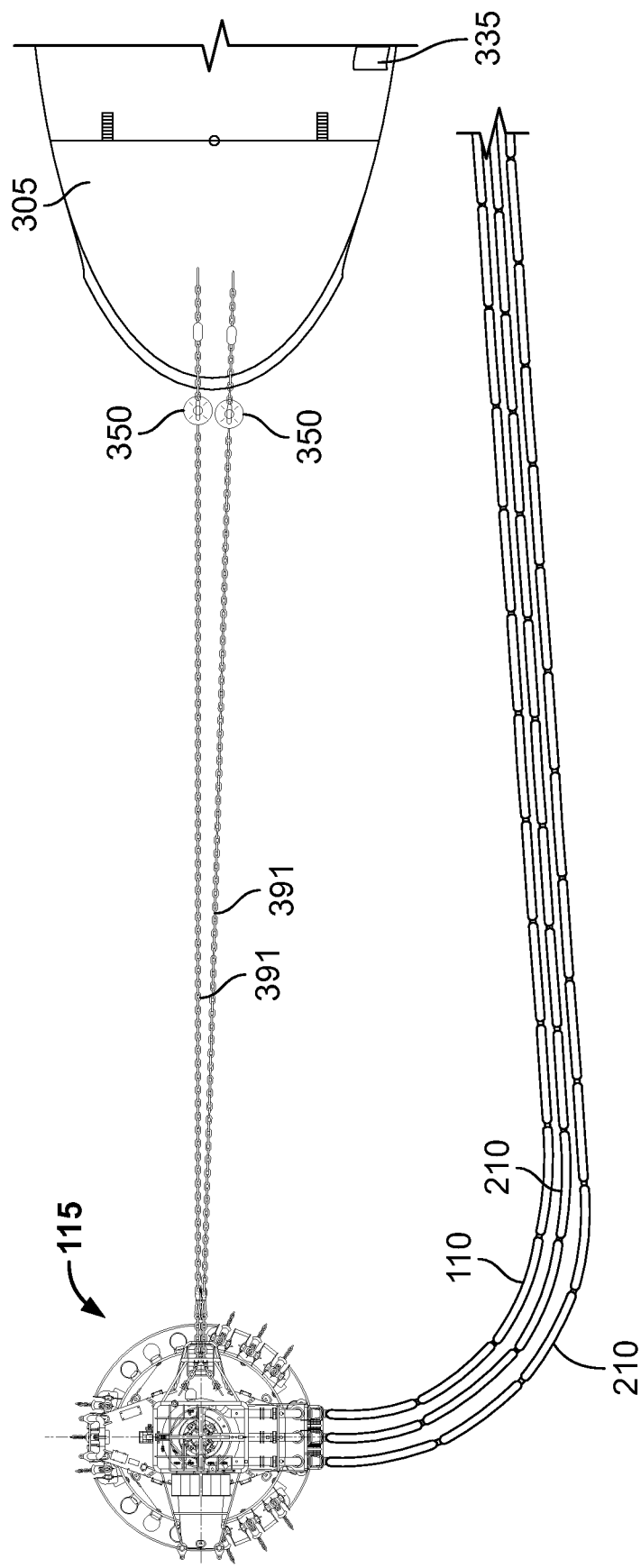
FIG. 4 depicts a schematic plan view of the single point mooring marine terminal shown in FIG. 3.

FIG. 3 depicts a schematic elevation view of an illustrative single point mooring marine terminal 101 having a floating vessel 305 moored thereto, according to one or more embodiments. FIG. 4 depicts a schematic plan view of the single point mooring marine terminal 101 as shown in FIG. 3. Referring now to FIG. 3 and FIG. 4, the floating vessel 305 can include a vessel storage tank 310. For example, the floating vessel 305 can be a floating production, storage, and offloading (FPSO) vessel, a floating storage and offloading (FSO) vessel, or a conventional liquid carrying tanker which may be a very large crude carriers (VLCC), and ultra large crude carriers (ULCCs), or any other size liquid carrying tanker. The floating vessel 305 can be moored to the buoy 115. In some examples, the vessel 305 can be moored to the buoy 115 via a Hawser arrangement 391. The Hawser arrangement 391 can be or include nylon rope, which can be shackled to a mooring uni-joint 220 on the buoy 115. A load pin 350 can be applied to the Hawser arrangement 391 to measure hawser loads. The Hawser arrangement 391 can be adapted or configured with one or more ropes depending on the tonnage of floating vessel 305. The ropes can be single-leg or grommet leg type ropes. By "vessel" it can be meant any type of floating structure including but not limited to tankers, boats, ships, and the like.

Referring now to FIGS. 1, 3, and 4, in some examples, the buoy 115 can be in fluid communication with a gas submarine conduit 340 and a first pipeline end manifold 315. In some examples, the buoy 115 can be in fluid communication with a liquid submarine conduit 345 and a second pipeline end manifold 325. The first pipeline end manifold 315 can be in fluid communication with a gas pipeline 330. The second pipeline end manifold 325 can be in fluid communication with a liquid pipeline 328. In some examples, the buoy 115 can be a catenary anchor leg mooring (CALM) type buoy, as depicted, or as a single anchor leg mooring (SALM) type buoy as described below. In some examples, the buoy 115 can be or can include the turntable 116 rotatably coupled to the buoy 115, as depicted, which is typically referred to as a "turntable buoy". In other examples, the buoy 115 can be or include a rotatable floating buoy coupled to a relatively geostationary turret, which is typically referred to as a "turret buoy". On a turret buoy, the turret can be suspended from a rotatable floating buoy and the turret can be coupled to the seafloor 301. The fluid swivel assembly 117 can be coupled to the turntable 116 or the rotatable floating buoy. As such, the buoy 115 can be what is typically called a turret buoy, a turntable buoy, or a single anchor leg mooring type buoy. The floating vessel 305 can be moored to the turntable 116 or the rotatable floating turret and can weathervane about the buoy 115

The buoy 115 can float in a body of water 126 and can be coupled or otherwise secured to the seafloor 301 by one or more anchor legs 303. The buoy 115 can be held in a relatively geostationary condition by the one or more anchor legs 303. The fluid swivel assembly 117 can include a first swivel section 118 rotatably coupled to a second swivel section 119. A first gas transfer conduit 120 can be in fluid communication with the first swivel section 118 and a second gas transfer conduit 125 can be in fluid communication with the second swivel section 119. The first swivel section 118 and the second swivel section 119 can be adapted or configured to maintain fluid communication between the first gas transfer conduit 120 and the second gas transfer conduit 125 during rotation therebetween and when there is no rotation therebetween.

The first floating conduit 110 can be in fluid communication with the vessel storage tank 310. The second gas transfer conduit 125 can be in fluid communication with the first pipeline end manifold 315, e.g., via the gas submarine conduit 340. In some examples, the second gas transfer conduit 125 can extend from the second swivel section 119 and transition into two or more second gas transfer conduits 128 (two are shown) and the two or more second gas transfer conduits 128 can be in fluid communication with the first pipeline end manifold 315. The first floating conduit 110, the first gas transfer conduit 120, and the second gas transfer conduit 125 can be adapted or configured to transfer or convey the gas displaced or otherwise conveyed from the vessel 305, for example from the vessel storage tank 310, to the first pipeline end manifold 315 located at a first subsea location 320.

The gas can be displaced from the vessel storage tank 310 to keep a pressure within the vessel storage tank 310 within specified ranges when introducing a liquid into the vessel storage tank 310. An end of the first gas transfer conduit 120 can be coupled to an end of the first floating conduit 110. In some examples, the end of the first gas transfer conduit 120 coupled to the first floating conduit 110 can have a declination angle ∂ relative to a local horizontal 152 of the buoy 115. Accordingly, a portion of the first floating conduit 110 can have a declination angle ∂. The declination angle ∂ can be from about one degree, about five degrees, or about 10 degrees to about 20 degrees, about 30 degrees, or about forty degrees from the local horizontal 152. The declination angle ∂ can cause the low point 130 within the first floating conduit 110. It should be noted that the local horizontal 152 may stay static with regard to the buoy 115 while a declination angle relative to a surface of the body of water 126 may change with wave action and other perturbations of the buoy 115.

The flow path including the fluid swivel assembly 117 can include the first swivel section 118, the second swivel section 119, the second gas transfer conduit 125, the gas submarine conduit 340, and the first pipeline end manifold 315. For example, the second end of the second condensation conduit 145 can be coupled to a portion of the first gas transfer conduit 120 and located such that any condensate 105 conveyed into the first gas transfer conduit 120 from the second condensation conduit 145 can fall down the first gas transfer conduit 120 through a path defined by the first swivel section 118, through the second swivel section 119, and down to the first pipeline end manifold 315. In some examples, at least a portion of the condensate 105 can collect or pool within a portion of the first pipeline end manifold 315 or the gas pipeline 330. The gas pipeline 330 can be an elongated conduit. The gas pipeline 330 can be in fluid communication with and span from the first pipeline end manifold 315 to another location, such as a near-shore or on-shore facility or location. The first floating conduit 110, the first gas transfer conduit 120, the fluid swivel assembly 117, the second gas transfer conduit 125, the gas submarine conduit 340, the first pipeline end manifold 315, and the gas pipeline 330 can be adapted or configured to transfer or convey the gas from the floating vessel 305 and/or the vessel storage tank 310 to the near-shore or on-shore location. The condensate 105 can be removed from the first pipeline end manifold 315 and/or the gas pipeline 330 utilizing a pipeline pig, for example, during a pigging maintenance operation.

In some examples, if the storage tank 107 is used, the storage tank 107 can be disposed on the buoy 115, e.g., on the turntable 116, can float adjacent the buoy 115, or can be located within or adjacent to the first subsea location 320. In some embodiments, when the storage tank 107 is subsea, the storage tank can be in fluid communication with the flow path including the fluid swivel assembly 117. The storage tank 107 can be adapted or configured to contain sufficient amounts of the condensate 105 such that removal of the condensate 105 from the storage tank 107 can be performed during normal maintenance activities for the buoy 115. The storage tank 107 can be made from any suitable material. For example, the storage tank 107 can be made from a synthetic fiber such as polyester or nylon filament, rubber, synthetic rubbers, a steel alloy, a polyvinyl chloride plastic, or other suitable materials.

A first liquid transfer conduit 160 (two are shown) can be in fluid communication with the second swivel section 119 and a second liquid transfer conduit 205 (two are shown) can be in fluid communication with the first swivel section 118. The first swivel section 118 and the second swivel section 119 can be adapted or configured to maintain fluid communication between the first liquid transfer conduit 160 and the second liquid transfer conduit 205 during rotation therebetween and when there is no rotation between the first swivel section 118 and the second swivel section 119.

The second pipeline end manifold 325 can be located at a second subsea location 327. The liquid pipeline 328 can be an elongated conduit. The liquid pipeline 328 can be in fluid communication with and span from the second pipeline end manifold 325 to another location, such as the near-shore or on-shore facility or location. The second pipeline end manifold 325 can be in fluid communication with the first liquid transfer conduit 160. The second liquid transfer conduit 205 can be in fluid communication with a second floating conduit 210 (two are shown). The second floating conduit 210 can be in fluid communication with the vessel 305 and/or the vessel storage tank 310. The liquid pipeline 328, the second pipeline end manifold 325, the first liquid transfer conduit 160, the fluid swivel assembly 117, the second liquid transfer conduit 205, and the second floating conduit 210 can be adapted or configured to convey a liquid, for example a liquid hydrocarbon, from the near-shore or on-shore location to the vessel 305 and/or the vessel storage tank 310. The liquid transferred from the liquid pipeline 328 to the vessel 305 and/or the vessel storage tank 310 can be or can include, but is not limited to, raw hydrocarbons such as crude oil or a fraction thereof, refined hydrocarbons such as, but not limited to, diesel fuel, jet fuel, kerosene, and/or gasoline, water, or any mixture thereof. The gas in the vessel storage tank 310 can be displaced from the vessel storage tank 310 simultaneously with the introduction of the liquid into the vessel storage tank 310.

The gas submarine conduit 340 can be adapted or configured to convey, in addition to the gas, liquids such as the condensate 105. The gas submarine conduit 340 can include a first submarine conduit 341 and a second submarine conduit 342. The gas submarine conduit 340 can be in fluid communication with the first pipeline end manifold 315 and the second gas transfer conduit 125. The gas submarine conduit 340 can be coupled between the first pipeline end manifold 315 and the second gas transfer conduit 125 for fluid communication therebetween. The gas submarine conduit 340 can be coupled between the first pipeline end manifold 315 and the two or more second gas transfer conduits 128 for fluid communication therebetween.

In some examples, the gas submarine conduit 340 can be configured in a Chinese lantern configuration between the buoy 115 and the first subsea location 320. For example, the first and second submarine conduits 341, 342 can each include one or more negatively buoyant members 362 coupled thereto between the first pipeline end manifold 315 and the second gas transfer conduit 125. In some examples, the one or more negatively buoyant members 362 can be coupled thereto between the first pipeline end manifold 315 and a midpoint of each of the first and second submarine conduits 341, 342. In other examples, the one or more negatively buoyant members 362 can be coupled to the first and second submarine conduits 341, 342 between the first pipeline end manifold 315 and the midpoint of each of the first and second submarine conduits 341, 342 and one or more negatively buoyant members 362 can be coupled to each of the first and second submarine conduits 341, 342 between the midpoint and the second gas transfer conduit 125. In still other examples, the first and second submarine conduits 341, 342 can include one or more negatively buoyant members 362 and one or more positively buoyant members 364 coupled thereto between the first pipeline end manifold 315 and the second gas transfer conduit 125. The positively buoyant member(s) 364, if present, can be located between the midpoint and the second gas transfer conduit 125, between the first pipeline end manifold 315 and the midpoint, or a combination thereof. As such, in some examples, one or more negatively buoyant members 362 and one or more positively buoyant members 364 can be distributed along the first and second submarine conduits 341, 342 to maintain the first and second submarine conduits 341, 342 in the Chinese lantern configuration.

The one or more negatively buoyant members 362 can urge each of the first and second submarine conduits 341, 342 toward the seafloor 302 to maintain the first and second submarine conduits 341, 342 in the Chinese lantern configuration. In other examples, the gas submarine conduit 340 can be adapted or configured in a steep-S configuration or a lazy-S configuration between the buoy 115 and the first subsea location 320. The gas submarine conduit 340 can be adapted or configured to convey the gas from the fluid swivel assembly 117 to the first subsea location 320, e.g., the pipeline end manifold 315. The one or more negatively buoyant members 362 can be made from any suitable material that can sink in water, e.g., sea water. For example, the one or more negatively buoyant members 362 can be made from or include metal chains, cement, lead, natural stone, metal alloy, or other suitable materials. The one or more positively buoyant members 364 can be made from or include syntactic foams, foamed thermoset or thermoplastic materials, thermoset or thermoplastic materials filled with particles (such as glass, plastic, micro-spheres, and/or ceramics), rubber, nylon, composites of these materials, any other material buoyant in water, e.g., sea water, or any combination thereof.

In some examples, the liquid submarine conduit 345 can include a third submarine conduit 346 and a fourth submarine conduit 347. The liquid submarine conduit 345 can be in fluid communication with the second pipeline end manifold 325 and the first liquid transfer conduit 160. The liquid submarine conduit 345 can be coupled between the second pipeline end manifold 325 and the first liquid transfer conduit 160. The liquid submarine conduit 345 can be adapted or configured in a Chinese lantern configuration, a steep-S configuration, or a lazy-S configuration between the buoy 115 and the second subsea location 327. For example, one or more negatively buoyant members 362 and one or more positively buoyant members 364 can be distributed along each of the third and fourth submarine conduits 346, 347 to maintain the third and fourth submarine conduits 346, 347 in the Chinese lantern configuration, the steep-S configuration, or the lazy-S configuration.

The gas submarine conduit 340 and the liquid submarine conduit 345 can be adapted or configured to compensate for motions of the buoy 115. The gas submarine conduit 340 and liquid submarine conduit 345 can be flexible and can be any type of elongated conduit. In some examples, the gas submarine conduit 340 and the liquid submarine conduit 345 can be comprised of a plurality of conduit segments connected together.

It should be understood that any of the conduits, e.g., the first floating conduit 110, the second floating conduit 210, the gas submarine conduit 340, the liquid submarine conduit 345, etc., can each be or can include a plurality of conduit segments connected thereto. The second floating conduit 210 and the liquid submarine conduit 345 can convey fluids such as the liquid. The first floating conduit 110, the second floating conduit 210, the gas submarine conduit 340, and the liquid submarine conduit 345 can be made from any suitable material. For example, the first floating conduit 110, the second floating conduit 210, the gas submarine conduit 340, and the liquid submarine conduit 345 can be made from a synthetic fiber such as polyester or nylon filament, rubber, synthetic rubbers, metal alloys, or other suitable materials.

In some examples, the pressure developed within the vessel storage tank 310 during liquid loading may not be sufficient to push the gas all the way through the gas pipeline 330. Accordingly, one or more blowers 335 (three are shown) can be used to maintain the pressure within the vessel storage tank 310 within specified design ranges. In some examples the blower 335 can be located at the first subsea location 320, on the buoy 115, floating adjacent the buoy 115, on the floating vessel 305, on an adjacent platform, and/or on shore in fluid communication with the gas pipeline 330. The blower 335 can be adapted or configured to provide a propulsive force within the conduits to assist the gas conveyance through the pipeline 330. For example, the blower 335 can increase a mass flow of the gas that can be conveyed from the vessel storage tank 310 through the pipeline 330 to another location such as the near-shore or on-shore facility or location. The blower 335 can induce or otherwise produce a partial vacuum and/or increase a pressure within the gas pipeline 330, the first pipeline end manifold 315, the second gas transfer conduit 125, the first floating conduit 110 and/or the first gas transfer conduit 120, to draw or otherwise urge the gas from the vessel 305 such that the gas can be conveyed to another location, such as the near-shore or on-shore facility or location.

The gas, once conveyed to the near-shore or on-shore facility or location, can be processed to reduce or remove at least a portion of one or more contaminants therefrom. In some examples, the gas can be an exhaust gas from the vessel that can include water and one or more contaminants. Such contaminants can be or can include, but are not limited to, oxides of sulfur (SOx), oxides of nitrogen (NOx), carbon monoxide, carbon dioxide, hydrocarbons, and carbon particles suspended in the gas, or any mixture thereof.

Figure 5:
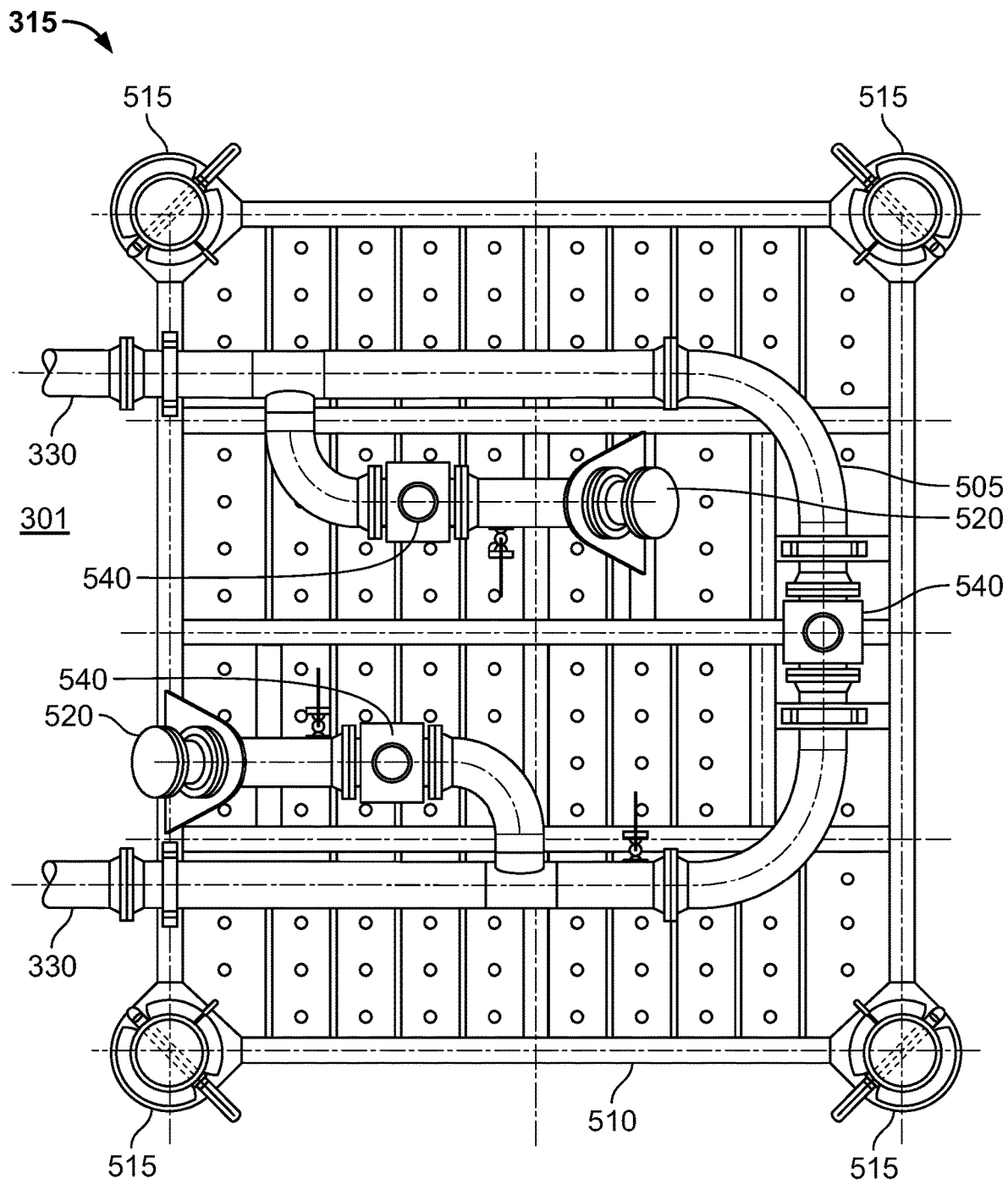
FIG. 5 depicts a schematic plan view of an illustrative first pipeline end manifold, according to one or more embodiments.
Figure 6:
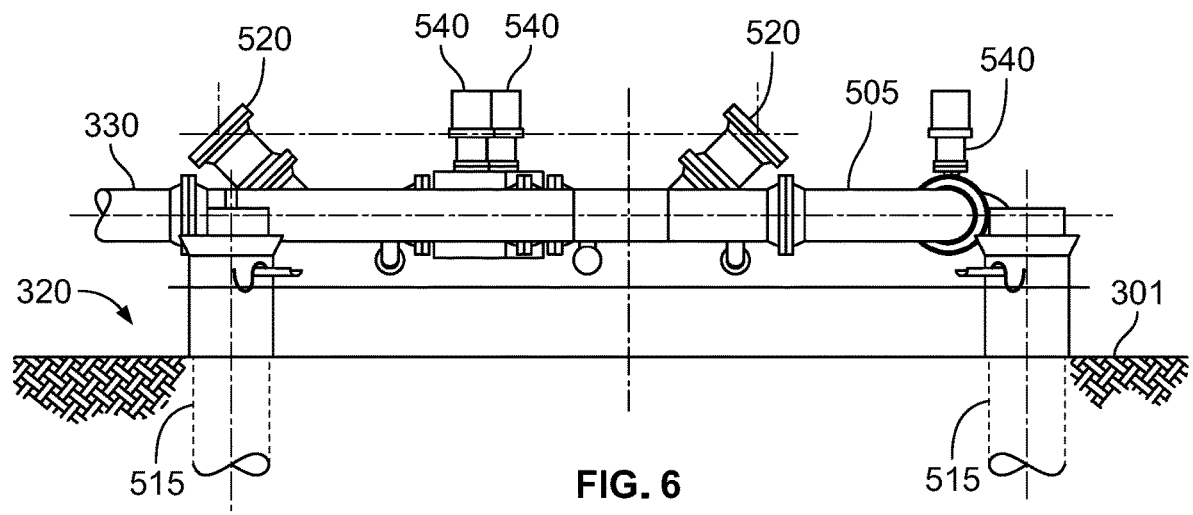
FIG. 6 depicts a schematic elevation view of the first pipeline end manifold shown in FIG. 5.

FIGS. 5 and 6 depict a schematic plan view and a schematic elevation view of the first pipeline end manifold 315, according to one or more embodiments. The first pipeline end manifold 315 can include a first pipeline end conduit 505 disposed on a skid 510. The skid 510 can be secured to the seafloor 301 by one or more piles 515 (four are shown) and/or ballast. The first pipeline end conduit 505 can include one or more valves 540 for fluid isolation within one or more portions of the first pipeline end conduit 505. One or more first interface connectors 520 (two are shown) can provide fluid communication from the first interface connectors 520 to the gas pipeline 330. The first pipeline end conduit 505 can have a U-shape or other curved shape to accommodate a pipeline pig for maintenance activities, for example for removal of the condensate 105 from the first pipeline end manifold 315 and/or the gas pipeline 330. A protective cage can surround the first pipeline end conduit 505 and/or the first pipeline end manifold 315 for protection from various environmental hazards.

Figure 7:
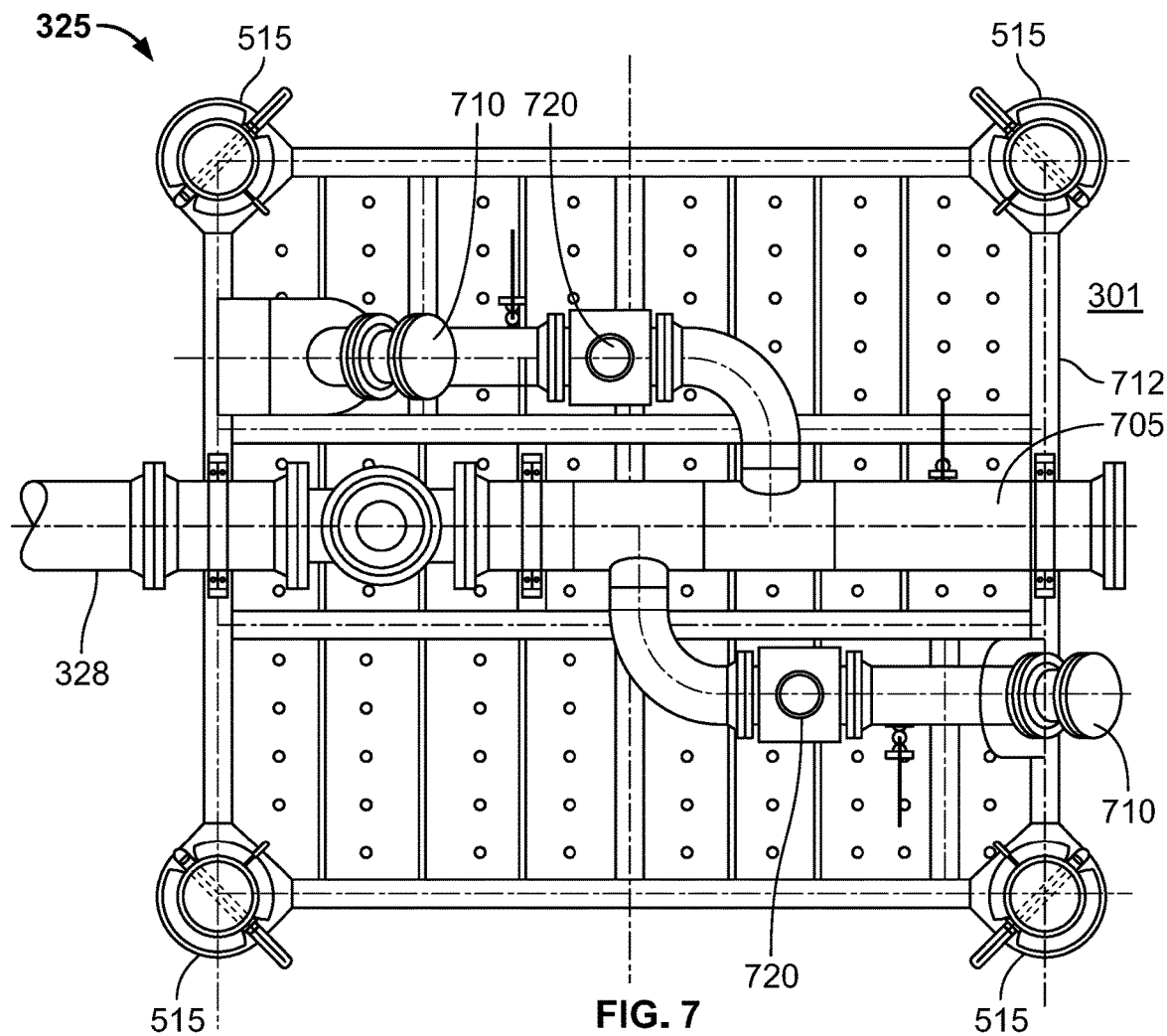
FIG. 7 depict a schematic plan view of an illustrative second pipeline end manifold, according to one or more embodiments.
Figure 8:
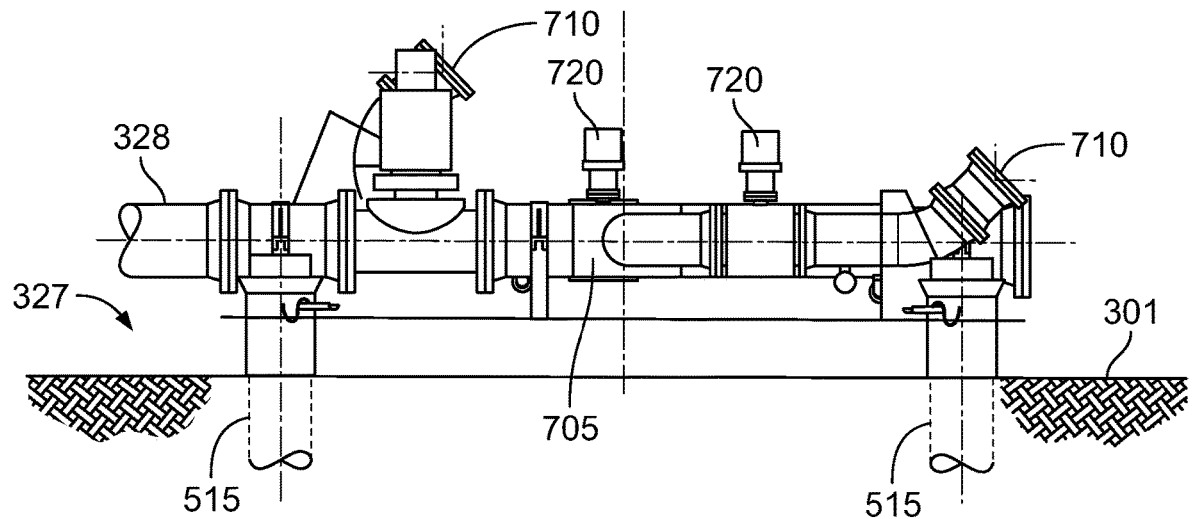
FIG. 8 depict a schematic elevation view of the second pipeline end manifold shown in FIG. 7.

FIGS. 7 and 8 depict a schematic plan view and a schematic elevation view of the second pipeline end manifold 325, according to one or more embodiments. The second pipeline end manifold 325 can include a second pipeline end conduit 705 disposed on a skid 712. The skid 712 can be secured to the seafloor 301 by the one or more piles 515 (four are shown) and/or ballast. The second pipeline end conduit 705 can include one or more valves 720 for fluid isolation within one or more portions of the second pipeline end conduit 705. One or more second interface connectors 710 (two are shown) can provide fluid communication from the second interface connectors 710 to the liquid pipeline 328. A protective cage can surround the second pipeline end conduit 705 and/or the second pipeline end manifold 325 for protection from various environmental hazards.

It should be understood that although the first pipeline end manifold 315 and the second pipeline end manifold 325 are depicted as being located at two locations 320, 327 on two different skids 510, 712 at some distance from one another, the first and second pipeline end manifolds 315, 325 can be located adjacent each other and/or formed or assembled on a single skid adapted or configured to accommodate the first pipeline end conduit 505 and the second pipeline end conduit 705.

Figure 9:
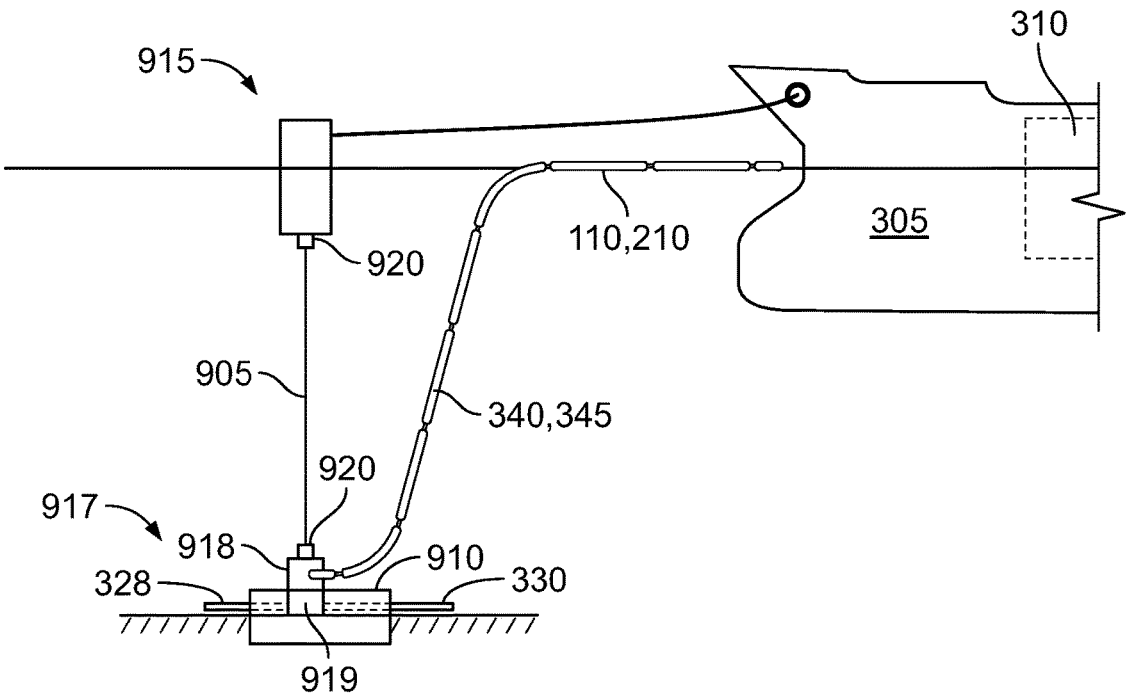
FIG. 9 depicts a schematic of another illustrative single point mooring marine terminal that includes a single anchor leg mooring (SALM) type buoy, according to one or more embodiments.

FIG. 9 depicts a schematic of another illustrative single point mooring marine terminal 901 that includes a single anchor leg mooring (SALM) type buoy 915, according to one or more embodiments. The buoy 915 can be anchored to the seabed by a single anchor leg 905. The single anchor leg 905 can be connected to a base 910 which can be ballasted and/or piled to a subsea location 917. The single anchor leg 905 can be attached to the base 910 by either a chain or by an elongated conduit. One or more universal joints 920 (two are shown) can allow the buoy 915 and the floating vessel 305 to rotate about the anchor leg 905 and/or the base 910. The first floating conduit 110 can be coupled to and in fluid communication with the gas submarine conduit 340. The second floating conduit 210 can be coupled to and in fluid communication with the liquid submarine conduit 345. Although described as separate conduits, the first floating conduit 110 and the gas submarine conduit 340 can be combined into a single gas conveyance conduit and the second floating conduit 210 and the liquid submarine conduit 345 can be combined into single liquid conveyance conduit.

The gas submarine conduit 340 can be in fluid communication with the first swivel section 918 and the gas pipeline 330. The liquid submarine conduit 345 can be in fluid communication with the the first swivel section 918 and the liquid pipeline 328. The first swivel section 918 and the second swivel section 919 can be adapted or configured to maintain fluid communication between the gas submarine conduit 340 and the gas pipeline 330 during rotation therebetween and when there is no rotation therebetween. The first swivel section 918 and the second swivel section 919 can be adapted or configured to maintain fluid communication between the liquid submarine conduit 345 and the liquid pipeline 328 during rotation therebetween and when there is no rotation therebetween. The liquid can be conveyed from the liquid pipeline 328, through the liquid submarine conduit 345, through the second floating conduit 210 and to the vessel 305 and/or the vessel storage tank 310. Gas discharged from the vessel 305 and/or the vessel storage tank 310 can be conveyed through the first floating conduit 110, through the gas submarine conduit 340, through the gas pipeline 330 to another location, such as the near-shore or on-shore facility or location.

Figure 10:
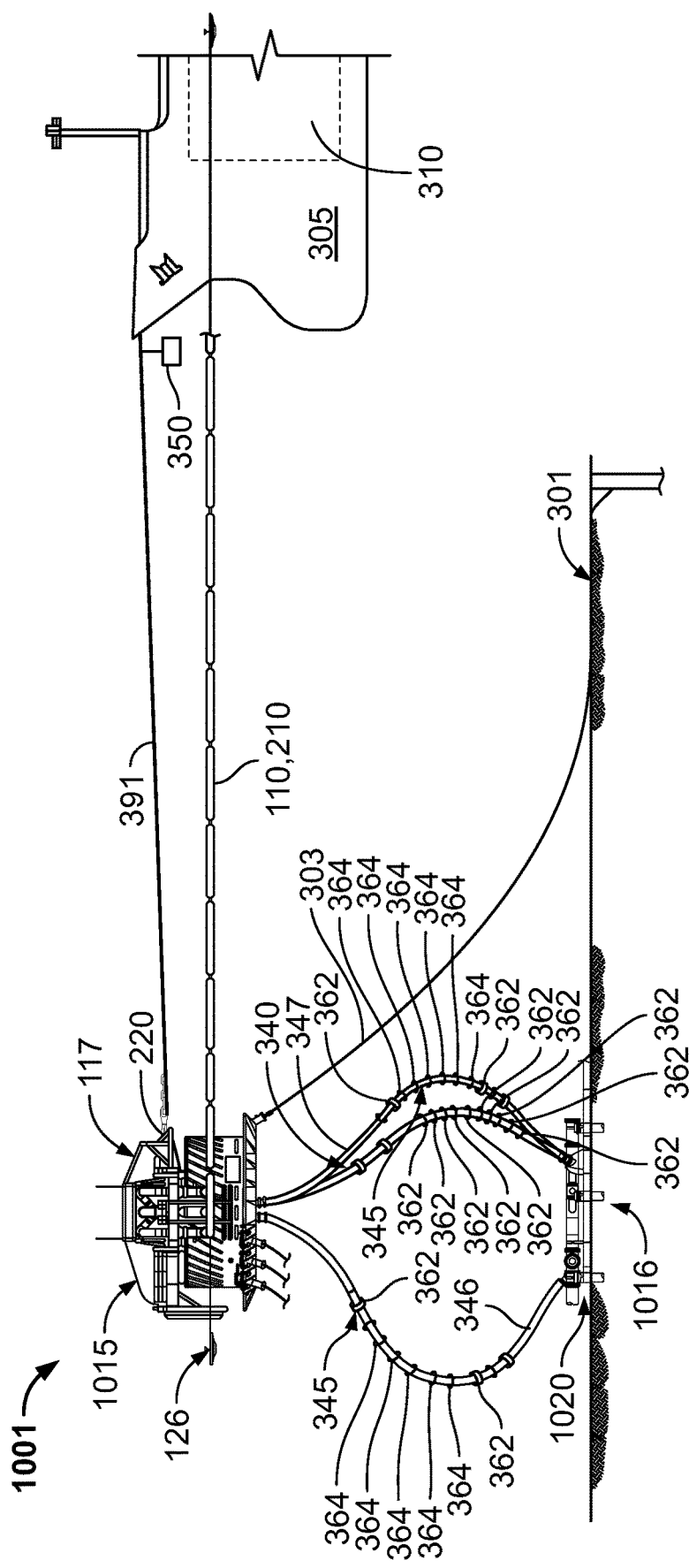
FIG. 10 depicts a schematic elevation view of yet another illustrative single point mooring terminal, including another illustrative buoy, according to one or more embodiments.
Figure 11:
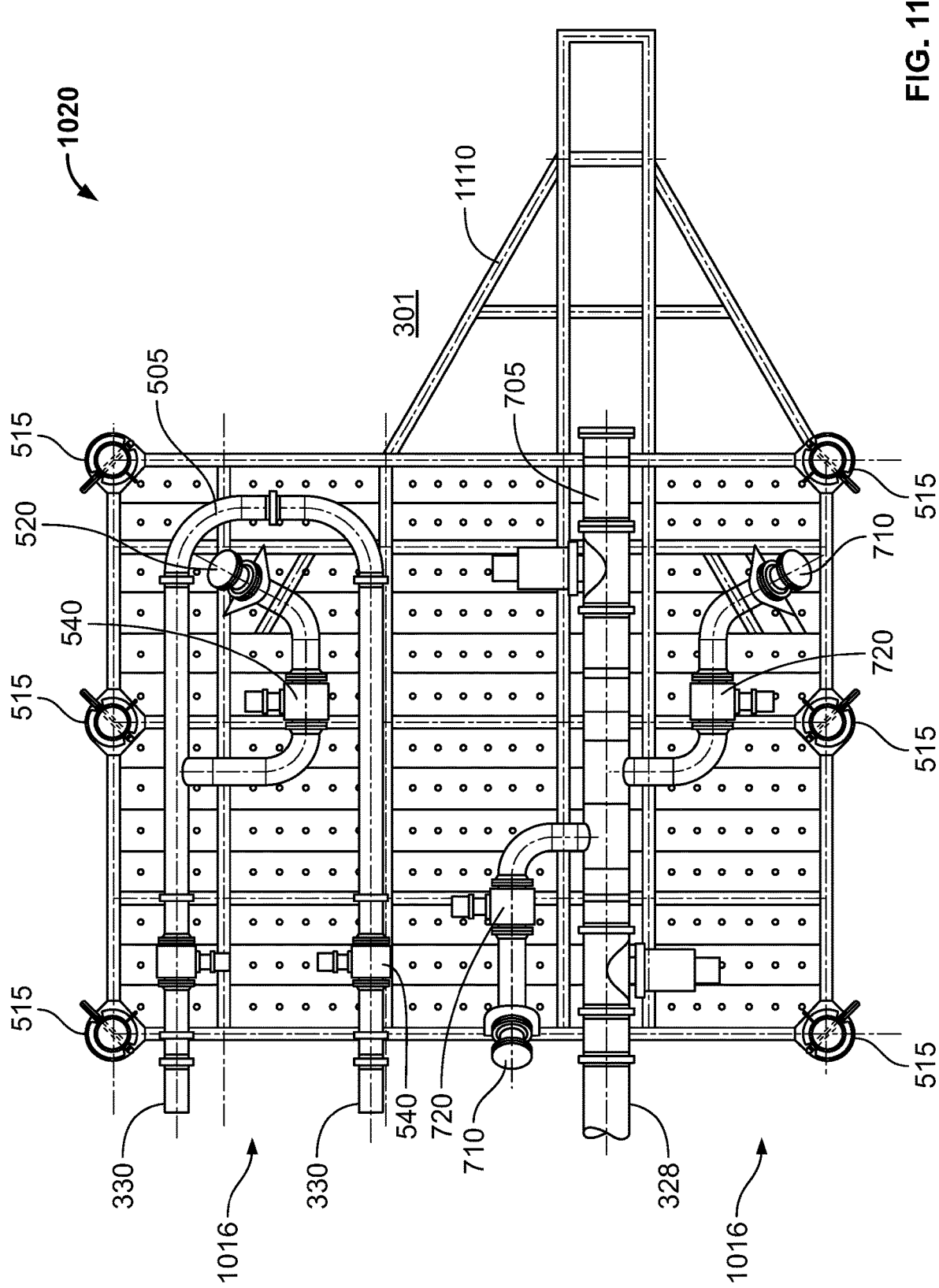
FIG. 11 depicts a schematic plan view of another pipeline end manifold, according to one or more embodiments.

FIG. 10 depicts a schematic elevation view of yet another illustrative single point mooring terminal 1001, including another illustrative buoy 1015, according to one or more embodiments. FIG. 11 depicts a schematic plan view of another pipeline end manifold 1016, according to one or more embodiments. The pipeline end manifold 1016 can be located at a subsea location 1020 and can include the first pipeline end conduit 505 and the second pipeline end conduit 705 disposed on a dual skid 1110. The gas pipeline 330 can be in fluid communication with and span from the pipeline end manifold 1016 to another location, such as a near-shore or on-shore facility or location. The first floating conduit 110, the gas submarine conduit 340 (one is shown), the first pipeline end conduit 505, and the gas pipeline 330 can be adapted or configured to transfer or convey the gas from the floating vessel 305 and/or the vessel storage tank 310 to the near-shore or on-shore location.

The liquid pipeline 328 can be in fluid communication with and span from the pipeline end manifold 1016 to another location, such as the near-shore or on-shore facility or location. The liquid pipeline 328, the second pipeline end conduit 705, the liquid submarine conduit 345 (two are shown), and the second floating conduit 210 can be adapted or configured to convey the liquid, for example the liquid hydrocarbon, from the near-shore or on-shore location to the floating vessel 305 and/or the vessel storage tank 310. The gas in the vessel storage tank 310 can be displaced from the vessel storage tank 310 simultaneously with the introduction of the liquid into the vessel storage tank 310.

In some examples, the gas submarine conduit 340 can be configured in a Chinese lantern configuration between the buoy 1015 and the subsea location 1020. The gas submarine conduit 340 can include one or more negatively buoyant members 162 coupled thereto (ten are shown) between the pipeline end manifold 1016 and the buoy 1015. In some examples, the one or more negatively buoyant members 362 can be coupled thereto between the pipeline end manifold 1016 and a midpoint of the gas submarine conduit 340. In other examples, one or more negatively buoyant members 362 can be coupled to the gas submarine conduit 340 between the pipeline end manifold 1016 and the midpoint of the gas submarine conduit 340 and one or more negatively buoyant members 362 can be coupled to the gas submarine conduit 340 between the midpoint and the buoy 1015.

The liquid submarine conduit 345 can be adapted or configured in a Chinese lantern configuration. For example, one or more positively buoyant members 364 can be distributed along the third submarine conduit 346 and the fourth submarine conduit 347 to maintain the liquid submarine conduit 345 in the Chinese lantern configuration. One or more positively buoyant members 364 and one or more negatively buoyant members 362 can be distributed along the third submarine conduit 346 and the fourth submarine conduit 347 to maintain the liquid submarine conduit 345 in the Chinese lantern configuration. The liquid submarine conduit 345 can be adapted or configured to convey the liquid from the subsea location 1020, e.g., the pipeline end manifold 1016, to the fluid swivel assembly 117.

It should be understood that rather than a single point mooring marine terminal, other types of mooring systems can be used to moor the floating vessel during transfer or conveyance of the gas from the vessel to the subsea location. In some examples, the vessel can be moored via a spread mooring system during conveyance of the gas from the vessel to the subsea location. A suitable spread mooring system can include the disconnectable spread mooring and riser tower system disclosed in U.S. patent application Ser. No. 16/527,345. In other examples, the vessel can be moored via a stabilized mooring system such as the stabilized mooring system disclosed in U.S. Patent Application No. 62/888,940. In other examples, the vessel can be moored via a disconnectable tower yoke mooring system such as those disclosed in U.S. Pat. No. 9,650,110 and Patent Application Nos. 62/830,082; and 62/830,088.

The present disclosure further relates to any one or more of the following numbered embodiments:

1. A system for recovering a condensate from a conduit, comprising: a floating buoy comprising a fluid swivel assembly coupled thereto, wherein the fluid swivel assembly comprises a first swivel section rotatably coupled to a second swivel section; a floating conduit, a first gas transfer conduit, and a second gas transfer conduit configured to transfer a gas discharged from a vessel storage tank to a pipeline end manifold located at a subsea location, wherein the floating conduit comprises a low point between the vessel storage tank and the first gas transfer conduit; and a first condensation conduit, a pump, and a second condensation conduit configured to transfer at least a portion of any condensate that accumulates within an internal volume of the floating conduit at the low point into a flow path defined by the first swivel section.

2. A system for recovering a condensate from a conduit, comprising: a floating buoy comprising a fluid swivel assembly coupled thereto, wherein the fluid swivel assembly comprises a first swivel section rotatably coupled to a second swivel section; a floating conduit, a first gas transfer conduit, and a second gas transfer conduit configured to convey a gas discharged from a vessel storage tank to a pipeline end manifold located at a subsea location, wherein the floating conduit comprises a low point between the vessel storage tank and the first gas transfer conduit; and a first condensation conduit, a pump, and a second condensation conduit configured to transfer at least a portion of any condensate that accumulates within an internal volume of the floating conduit at the low point into a storage tank.

3. The system according to paragraph 1 or 2, wherein a first end of the first condensation conduit is disposed within the floating conduit.

4. The system according to paragraph 1 or 2, wherein a first end of the first condensation conduit is disposed within the floating conduit, and wherein a weight of the first end of the first condensation conduit is sufficient to urge the first end of the first condensation conduit toward the low point of the floating conduit.

5. The system according to paragraph 1 or 2, wherein a first end of the first condensation conduit is disposed within the floating conduit, and wherein the first end of the first condensation conduit is connected to an inner wall of the floating conduit at the low point such that the first end of the first condensation conduit is maintained within the low point of the floating conduit.

6. The system according to paragraph 1 or 2, wherein: a first end of the first condensation conduit is disposed within the floating conduit and comprises a weighted filter, an outlet of the weighted filter is in fluid communication with the first condensation conduit, and an inlet of the weighted filter is in fluid communication with the internal volume of the floating conduit at the low point of the floating conduit.

7. The system according to paragraph 1 or 2, wherein a first end of the first condensation conduit is in fluid communication with the internal volume at the low point through an aperture disposed through a side wall of the floating conduit.

8. The system according to any of paragraphs 1 to 7, wherein the pump is disposed on the buoy.

9. The system according to any of paragraphs 1 to 8, wherein a portion of the floating conduit has a declination angle of about between twelve to eighteen degrees from a local horizontal of the buoy.

10. The system according to any of paragraphs 1 to 9, further comprising: a first liquid transfer conduit and a second liquid transfer conduit, wherein: the first swivel section and the second swivel section are configured to maintain fluid communication between the first liquid transfer conduit and the second liquid transfer conduit, and the first swivel section and the second swivel section are configured to maintain fluid communication between the first gas transfer conduit and the second gas transfer conduit.

11. The system according to paragraph 10, wherein: the subsea location is a first subsea location, the first liquid transfer conduit and the second liquid transfer conduit are configured to transfer a liquid from a second subsea location, through the floating buoy, and into the vessel; and the first gas transfer conduit and the second gas transfer conduit are configured to transfer the gas discharged from the vessel, through the floating buoy, and into the pipeline end manifold.

12. The system according paragraph 10 or 11, wherein the pipeline end manifold is a first pipeline end manifold, and wherein the system further comprises: a gas submarine conduit in fluid communication with the first pipeline end manifold and the second gas transfer conduit; and a liquid submarine conduit in fluid communication with a second pipeline end manifold and the first liquid transfer conduit, wherein the gas submarine conduit and the liquid submarine conduit are each configured in a Chinese lantern configuration, a steep-S configuration, or a lazy-S configuration between the floating buoy and the first and second subsea locations.

13. The system according to any of paragraphs 10 to 12, further comprising: a gas submarine conduit in fluid communication with the first pipeline end manifold and the second gas transfer conduit; and a liquid submarine conduit in fluid communication with the second pipeline end manifold and the first liquid transfer conduit, wherein: the liquid submarine conduit is configured in a steep-S configuration or a lazy-S configuration between the second subsea location and the floating buoy, and the gas submarine conduit is configured in a Chinese lantern configuration between the floating buoy and the first subsea location.

14. The system according to any of paragraphs 1 to 13, wherein: the floating buoy is secured to the seafloor and held in a relatively geostationary condition by one or more anchor legs, and the first swivel section rotates with a rotatable turntable.

15. The system according to any of paragraphs 1 to 14, wherein the second gas transfer conduit extends from the second swivel section and transitions into two or more second gas transfer conduits.

16. The system according to paragraph 15, wherein each of the two or more second gas transfer conduits are in fluid communication with the pipeline end manifold.

17. The system according to any of paragraphs 1 to 16, further comprising a turntable rotatably coupled to the buoy.

18. The system according to paragraph 17, wherein the fluid swivel assembly is coupled to the turntable.

19. The system according to any of paragraphs 1 to 18, wherein a floating vessel is moored to the floating buoy.

20. The system according to paragraph 19, wherein the floating vessel weathervanes about the floating buoy.

21. The system according to any of paragraphs 2 to 20, wherein the storage tank is disposed on the buoy.

22. The system according to any of paragraphs 17 to 21, wherein the storage tank is disposed on the turntable.

23. The system according to any of paragraphs 2 to 22, wherein the storage tank is in fluid communication with the pipeline end manifold.

24. A process for recovering a condensate from a floating conduit, comprising: conveying a gas from a vessel through a floating conduit and into a gas transfer conduit; conveying the gas through the gas transfer conduit and into a flow path defined by a fluid swivel assembly, wherein a portion of the gas condenses within an internal volume of the floating conduit during transfer of the gas therethrough to produce a liquid condensate; and pumping, with a pump in fluid communication with the internal volume at a low point of the floating conduit, at least a portion of the liquid condensate from the internal volume into the gas transfer conduit such that the at least a portion of the liquid condensate flows into the flow path defined by the fluid swivel assembly.

25. A process for recovering a condensate from a floating conduit, comprising: conveying a gas from a vessel through a floating conduit and into a gas transfer conduit; conveying the gas through the gas transfer conduit and into a flow path defined by a fluid swivel assembly, wherein a portion of the gas condenses within an internal volume of the floating conduit during transfer of the gas therethrough to produce a liquid condensate; and pumping, with a pump in fluid communication with the internal volume at a low point of the floating conduit, at least a portion of the liquid condensate from the internal volume into the gas transfer conduit such that the at least a portion of the liquid condensate flows into a storage tank.

26. The process according to paragraph 24 or 25, further comprising conveying the liquid condensate into a pipeline end manifold located at a subsea location.

27. The process according to any of paragraphs 24 to 26, further comprising removing at least a portion of the liquid condensate from the pipeline end manifold with a pipeline pig.

28. The process according to any of paragraphs 24, 25, or 27, wherein: the fluid swivel assembly comprises a first swivel section rotatably coupled to a second swivel section, the gas transfer conduit is a first gas transfer conduit and is in fluid communication with a flow path defined by the first swivel section, a second gas transfer conduit is in fluid communication with a flow path defined by the second swivel section and a pipeline end manifold located at a subsea location, the floating conduit, the first gas transfer conduit, and the second gas transfer conduit are configured to convey the gas discharged from the vessel to the pipeline end manifold, a first condensation conduit having a first end that is in fluid communication with the internal volume of the floating conduit at the low point of the floating conduit and a second end that is in fluid communication with an inlet of the pump, a second condensation conduit having a first end that is in fluid communication with an outlet of the pump and a second end that is in fluid communication with the flow path defined by the first swivel section or the storage tank, and the first condensation conduit, the pump, and the second condensation conduit are configured to convey the at least a portion of the liquid condensate from the internal volume into the flow path defined by the first swivel section or the storage tank.

29. The process according to any of paragraphs 26 to 28, wherein: the floating conduit is a first floating conduit, the subsea location is a first subsea location, a first liquid transfer conduit is in fluid communication with a second pipeline end manifold located at a second subsea location, a second liquid transfer conduit is in fluid communication with a second floating conduit, and the first liquid transfer conduit, the second liquid transfer conduit, and the second floating conduit are configured to convey a liquid from the second pipeline end manifold to the vessel storage tank.

30. The process according to any of paragraphs 24 to 29, wherein the floating buoy is a single point mooring marine terminal.

31. The process according to any of paragraphs 24 to 30, wherein the gas comprises an exhaust gas, air, an inert gas, a hydrocarbon gas, or a mixture thereof.

32. A system for recovering a condensate from a floating conduit, comprising: a floating buoy comprising a rotatable turntable, wherein the rotatable turntable comprises a fluid swivel assembly coupled thereto, and wherein the fluid swivel assembly comprises a first swivel section rotatably coupled to a second swivel section; a first gas transfer conduit in fluid communication with a first flow path defined by the first swivel section; a second gas transfer conduit in fluid communication with a first flow path defined by the second swivel section and a first pipeline end manifold located at a first subsea location; a first floating conduit in fluid communication with the first gas transfer conduit, wherein: the first floating conduit, the first gas transfer conduit, and the second gas transfer conduit are configured to convey a gas discharged from a vessel storage tank, through the floating buoy, and into the first pipeline end manifold, and the first floating conduit comprises a low point between the vessel storage tank and the first gas transfer conduit; a first condensation conduit having a first end in fluid communication with an internal volume of the first floating conduit at the low point of the first floating conduit; a pump in fluid communication with a second end of the first condensation conduit, wherein the pump comprises an air driven positive displacement or diaphragm pump, an electric powered pump, a hydraulic driven pump, or a hydrocarbon powered pump; and a second condensation conduit, wherein: a first end of the second condensation conduit is in fluid communication with the pump and a second end of the second condensation conduit is in fluid communication with the flow path defined by the first swivel section, and the first condensation conduit, the pump, and the second condensation conduit are configured to convey a liquid condensate from the internal volume of the first floating conduit into the flow path defined by the first swivel section; a first liquid transfer conduit in fluid communication with a second flow path defined by the first swivel section; and a second liquid transfer conduit in fluid communication with a second flow path defined by the second swivel section and a second pipeline end manifold located at a second subsea location, wherein: the first swivel section and the second swivel section are configured to maintain fluid communication between the first liquid transfer conduit and the second liquid transfer conduit, the first swivel section and the second swivel section are configured to maintain fluid communication between the first gas transfer conduit and the second gas transfer conduit, and the first liquid transfer conduit and the second liquid transfer conduit are configured to transfer a liquid from a second subsea location, through the floating buoy, and into the vessel storage tank.

33. The system or process according to any of paragraphs 1 to 32, wherein the gas comprises an exhaust gas.

34. The system or process according to any of paragraphs 1 to 33, wherein the gas comprises air.

35. The system or process according to any of paragraphs 1 to 34, wherein the gas comprises an inert gas.

36. The system or process according to any of paragraphs 1 to 35, wherein the gas comprises a hydrocarbon gas.

37. The system or process according to any of paragraphs 1 to 36, the liquid comprises water, raw hydrocarbons, refined hydrocarbons, or a mixture thereof.

38. The system or process according to any of paragraphs 1 to 37, wherein the buoy is a single point mooring marine terminal.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim can be not defined above, it should be given the broadest definition persons in the pertinent art have given that term as reflected in at least one printed publication or issued patent. Furthermore, all patents, test procedures, and other documents cited in this application are fully incorporated by reference to the extent such disclosure can be not inconsistent with this application and for all jurisdictions in which such incorporation can be permitted.

While certain preferred embodiments of the present invention have been illustrated and described in detail above, it can be apparent that modifications and adaptations thereof will occur to those having ordinary skill in the art. It should be, therefore, expressly understood that such modifications and adaptations may be devised without departing from the basic scope thereof, and the scope thereof can be determined by the claims that follow.

What is claimed is:

1. A system for recovering a condensate from a conduit, comprising:
   a floating buoy comprising a fluid swivel assembly coupled thereto, wherein the fluid swivel assembly comprises a first swivel section rotatably coupled to a second swivel section;
   a floating conduit, a first gas transfer conduit, and a second gas transfer conduit configured to transfer a gas discharged from a vessel storage tank to a pipeline end manifold located at a subsea location, wherein the floating conduit comprises a low point between the vessel storage tank and the first gas transfer conduit; and
   a first condensation conduit, a pump, and a second condensation conduit configured to transfer at least a portion of any condensate that accumulates within an internal volume of the floating conduit at the low point into a flow path defined by the first swivel section, a condensate storage tank, or a service vessel.

2. The system of claim 1, wherein:

a first end of the first condensation conduit is disposed within the floating conduit and comprises a weighted filter,
an outlet of the weighted filter is in fluid communication with the first condensation conduit; and
an inlet of the weighted filter is in fluid communication with the internal volume of the floating conduit at the low point of the floating conduit.

3. The system of claim 1, further comprising:
a first liquid transfer conduit and a second liquid transfer conduit, wherein:
the first swivel section and the second swivel section are configured to maintain fluid communication between the first liquid transfer conduit and the second liquid transfer conduit, and
the first swivel section and the second swivel section are configured to maintain fluid communication between the first gas transfer conduit and the second gas transfer conduit.

4. The system of claim 1, wherein:
the floating buoy is secured to the seafloor and held in a relatively geostationary condition by one or more anchor legs; and
the first swivel section rotates with a rotatable turntable.

5. The system of claim 1, wherein, when a floating vessel is moored to the floating buoy, the floating vessel weathervanes about the floating buoy.

6. A process for recovering a condensate from a floating conduit, comprising:
conveying a gas from a vessel through a floating conduit and into a gas transfer conduit;
conveying the gas through the gas transfer conduit and into a flow path defined by a fluid swivel assembly connected to a floating buoy, wherein a portion of the gas condenses within an internal volume of the floating conduit during transfer of the gas therethrough to produce a liquid condensate; and
pumping, with a pump in fluid communication with the internal volume at a low point of the floating conduit, at least a portion of the liquid condensate from the internal volume into the flow path defined by the fluid swivel assembly, a condensate storage tank, or a service vessel.

7. The process of claim 6, wherein the at least a portion of the liquid condensate is pumped into the flow path defined by the fluid swivel assembly or the condensate storage tank, the process further comprising conveying the at least a portion of the liquid condensate into a pipeline end manifold located at a subsea location.

8. The process of claim 7, wherein the at least a portion of the liquid condensate is pumped into the condensate storage tank prior to conveying the at least a portion of the liquid condensate into the pipeline end manifold.

9. The process of claim 6, wherein:
the fluid swivel assembly comprises a first swivel section rotatably coupled to a second swivel section,
the gas transfer conduit is a first gas transfer conduit and is in fluid communication with a flow path defined by the first swivel section,
a second gas transfer conduit is in fluid communication with a flow path defined by the second swivel section and a pipeline end manifold located at a subsea location,
the floating conduit, the first gas transfer conduit, and the second gas transfer conduit are configured to convey the gas discharged from the vessel to the pipeline end manifold, a first condensation conduit having a first end that is in fluid communication with the internal volume of the floating conduit at the low point of the floating conduit and a second end that is in fluid communication with an inlet of the pump,
a second condensation conduit having a first end that is in fluid communication with an outlet of the pump and a second end that is in fluid communication with the flow path defined by the first swivel section, the condensate storage tank, or the service vessel, and
the first condensation conduit, the pump, and the second condensation conduit convey the at least a portion of the liquid condensate from the internal volume into the flow path defined by the first swivel section, the condensate storage tank, or the service vessel.

10. The process of claim 9, wherein:
the floating conduit is a first floating conduit,
the subsea location is a first subsea location,
a first liquid transfer conduit is in fluid communication with a second pipeline end manifold located at a second subsea location,
a second liquid transfer conduit is in fluid communication with a second floating conduit, and
the first liquid transfer conduit, the second liquid transfer conduit, and the second floating conduit are configured to convey a liquid from the second pipeline end manifold into the vessel storage tank.

11. The process of claim 6, wherein the floating buoy is a single point mooring marine terminal.

12. A system for recovering a condensate from a floating conduit, comprising:
a floating buoy comprising a rotatable turntable, wherein the rotatable turntable comprises a fluid swivel assembly coupled thereto, and wherein the fluid swivel assembly comprises a first swivel section rotatably coupled to a second swivel section;
a first gas transfer conduit in fluid communication with a first flow path defined by the first swivel section;
a second gas transfer conduit in fluid communication with a first flow path defined by the second swivel section and a first pipeline end manifold located at a first subsea location;
a first floating conduit in fluid communication with the first gas transfer conduit, wherein:
the first floating conduit, the first gas transfer conduit, and the second gas transfer conduit are configured to convey a gas discharged from a vessel storage tank, through the floating buoy, and into the first pipeline end manifold, and
the first floating conduit comprises a low point between the vessel storage tank and the first gas transfer conduit;
a first condensation conduit having a first end in fluid communication with an internal volume of the first floating conduit at the low point of the first floating conduit;
a pump in fluid communication with a second end of the first condensation conduit ; and
a second condensation conduit, wherein:
a first end of the second condensation conduit is in fluid communication with the pump and a second end of the second condensation conduit is in fluid communication with the flow path defined by the first swivel section, a condensate storage tank, or configured to be in fluid communication with a service vessel, and
the first condensation conduit, the pump, and the second condensation conduit are configured to convey a liquid condensate from the internal volume of the first floating conduit into the flow path defined by the first swivel section, the condensate storage tank, or the service vessel;

a first liquid transfer conduit in fluid communication with a second flow path defined by the first swivel section; and a second liquid transfer conduit in fluid communication with a second flow path defined by the second swivel section and a second pipeline end manifold located at a second subsea location, wherein:

the first swivel section and the second swivel section are configured to maintain fluid communication between the first liquid transfer conduit and the second liquid transfer conduit, the first swivel section and the second swivel section are configured to maintain fluid communication between the first gas transfer conduit and the second gas transfer conduit, and the first liquid transfer conduit and the second liquid transfer conduit are configured to transfer a liquid from a second subsea location, through the floating buoy, and into the vessel storage tank.

13. The process of claim 6, wherein:

the floating buoy comprises a turntable rotatably coupled to the floating buoy, the fluid swivel assembly comprises a first swivel section rotatably coupled to a second swivel section, the first swivel section is connected to and rotates with the turntable, and the second swivel section is connected to the floating buoy.

14. The process of claim 7, wherein:

the pipeline end manifold comprises a pipeline end conduit that is in fluid communication with a gas pipeline, the liquid condensate is conveyed into the pipeline end conduit, and a central longitudinal axis of the pipeline end conduit and a central longitudinal axis of the gas pipeline are aligned with one another.

15. The system of claim 1, wherein the first condensation conduit, the pump, and the second condensation conduit are configured to transfer the at least a portion of any condensate that accumulates within the internal volume of the floating conduit at the low point into the condensate storage tank.

16. The system of claim 15, wherein the condensate storage tank is disposed on the floating buoy, floats adjacent to the floating buoy, or is located subsea.

17. The system of claim 1, wherein the first condensation conduit, the pump, and the second condensation conduit are configured to transfer the at least a portion of any condensate that accumulates within the internal volume of the floating conduit at the low point into the service vessel.

18. The system of claim 1, wherein:

the floating buoy comprises a turntable rotatably coupled to the floating buoy, the first swivel section is connected to and rotates with the turntable, the second swivel section is connected to the floating buoy, the first gas transfer conduit is connected to the first swivel section, the second gas transfer conduit is connected to the second swivel section, and the floating conduit is connected to the first gas transfer conduit.

19. The system of claim 1, wherein:

the floating buoy comprises a turntable rotatably coupled to the floating buoy, the pump comprises an air driven pump, and the system further comprises an air tank disposed on the turntable that is configured to provide compressed air to the pump.

20. The system of claim 1, wherein the pipeline end manifold comprises a pipeline end conduit that is in fluid communication with a gas pipeline, and wherein a central longitudinal axis of the pipeline end conduit and a central longitudinal axis of the gas pipeline are aligned with one another.

\* \* \* \* \*